US008869541B2

(12) United States Patent
Heitzler et al.

(10) Patent No.: US 8,869,541 B2
(45) Date of Patent: Oct. 28, 2014

(54) THERMAL GENERATOR WITH MAGNETOCALORIC MATERIAL AND INCORPORATED HEAT TRANSFER FLUID CIRCULATION MEANS

(75) Inventors: Jean-Claude Heitzler, Horbourg-Wihr (FR); Christian Muller, Strasbourg (FR)

(73) Assignee: Cooltech Applications Societe par actions simplifiee, Strasbourg (FR)

( * ) Notice: Subject to any disclaimer, the term of this patent is extended or adjusted under 35 U.S.C. 154(b) by 941 days.

(21) Appl. No.: 12/682,899

(22) PCT Filed: Oct. 17, 2008

(86) PCT No.: PCT/FR2008/001467
§ 371 (c)(1),
(2), (4) Date: Apr. 14, 2010

(87) PCT Pub. No.: WO2009/087310
PCT Pub. Date: Jul. 16, 2009

(65) Prior Publication Data
US 2010/0236258 A1     Sep. 23, 2010

(30) Foreign Application Priority Data
Oct. 30, 2007 (FR) ...................................... 07 07612

(51) Int. Cl.
F25B 21/00     (2006.01)
(52) U.S. Cl.
CPC ......... *F25B 21/00* (2013.01); *F25B 2321/0022* (2013.01); *Y02B 30/66* (2013.01)
USPC ............................................... 62/3.1; 62/3.3

(58) Field of Classification Search
USPC .............. 62/3.1, 630, 335, 442, 3.3, 6; 92/71; 60/517; 165/104.19; 219/623, 618; 417/415, 269
See application file for complete search history.

(56) References Cited

U.S. PATENT DOCUMENTS 3,803,857 A *   4/1974   Ishizaki .............................. 62/6
3,935,899 A *   2/1976   Jolly ............................. 165/240
(Continued)

FOREIGN PATENT DOCUMENTS

| EP | 0357291 | 3/1990 | |
| JP | 58088474 | 5/1983 | |
| WO | WO 03/016794 A1 * | 2/2003 | .............. F25B 21/00 |
| WO | WO 03016794 A1 * | 2/2003 | |
| WO | 2004059221 | 7/2004 | |
| WO | 2005093343 | 10/2005 | |
| WO | 2005095872 | 10/2005 | |
| WO | WO 2006/073395 A1 * | 7/2006 | ................ F01B 1/06 |
| WO | WO 2006/074790 * | 7/2006 | .............. F25B 21/00 |
| WO | 2007026062 | 3/2007 | |
| WO | 2007086638 | 8/2007 | |

*Primary Examiner* — Cheryl J Tyler
*Assistant Examiner* — Harry Arant
(74) *Attorney, Agent, or Firm* — Davis & Bujold, PLLC; Michael J. Bujold (57) ABSTRACT

A heat generator (1) having at least one thermal module (10) that has N adjacent magnetocaloric elements (2) arranged in a circle around a central axis (A) and is subjected to a varying magnetic field caused by magnetic devices (3). The magnetocaloric elements (2) are associated with N pistons (40) subjected to a reciprocating translation movement by an actuating cam (70) to circulate the heat transfer fluid, contained in the thermal module (10), in two opposite directions, at the same time, so that a first fraction of the heat transfer fluid circulates towards a hot exchange chamber (5), through the magnetocaloric elements (2) and is subjected to a heating cycle, and a second fraction of the heat transfer fluid circulates towards a cold exchange chamber (6), through the magnetocaloric elements (2), and is subjected to a cooling cycle, and inversely. The exchange chambers (5, 6) are coupled with external circuits that use calories and frigories for heating, air-conditioning, tempering systems, etc.

15 Claims, 9 Drawing Sheets

(56) References Cited

U.S. PATENT DOCUMENTS

| | | | |
|---|---|---|---|
| 4,507,928 A | * | 4/1985 | Johnson ............... 62/3.1 |
| 4,796,430 A | * | 1/1989 | Malaker et al. ............ 62/6 |
| 4,829,770 A | | 5/1989 | Hashimoto |
| 5,249,424 A | * | 10/1993 | DeGregoria et al. ........ 62/3.1 |
| 6,389,819 B1 | * | 5/2002 | Zhu et al. .................. 62/6 |
| 6,959,554 B1 | | 11/2005 | Shirron et al. |
| 7,038,565 B1 | | 5/2006 | Chell |
| 2003/0074897 A1 | * | 4/2003 | Rollston ............... 60/517 |
| 2007/0125095 A1 | | 6/2007 | Iwasaki et al. |
| 2007/0130960 A1 | * | 6/2007 | Muller et al. ............ 62/3.1 |
| 2007/0144181 A1 | | 6/2007 | Kitanovski et al. |
| 2008/0223853 A1 | | 9/2008 | Muller et al. |
| 2008/0236172 A1 | | 10/2008 | Muller et al. |

* cited by examiner

THERMAL GENERATOR WITH MAGNETOCALORIC MATERIAL AND INCORPORATED HEAT TRANSFER FLUID CIRCULATION MEANS

This application is a national stage completion of PCT/FR2008/001467 filed Oct. 17, 2008 which claims priority from French Application Serial No. 07/07612 filed on Oct. 30, 2007.

TECHNICAL SCOPE

The present invention relates to a heat generator comprising magnetocaloric elements, magnetic devices arranged so as to alternately subject said magnetocaloric elements to a variation in magnetic field and alternately create a heating cycle and a cooling cycle in each magnetocaloric element, at least one heat transfer fluid arranged to collect the calories and/or frigories produced by said magnetocaloric elements during the heating and cooling cycles, at least one hot exchange chamber and one cold exchange chamber respectively placed at the hot and cold ends of said generator, and means of circulation for the heat transfer fluid between said magnetocaloric elements and said exchange chambers, with the said generator comprising at least one thermal module comprising at least one set of N magnetocaloric elements.

PRIOR TECHNIQUE

Magnetic refrigeration technology has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

Publication U.S. Pat. No. 4,829,770 looks particularly at the composition of the magnetocaloric elements and describes a heat generator which uses such elements and whose operation is based on the principle of the Stirling engine. A heat transfer gas, in particular nitrogen, runs through these fixed magnetocaloric elements, while the whole assembly is contained within a tank subjected to a reciprocating translation movement, synchronized with the variation in magnetic field. Helium heat exchangers are connected to the hot and cold ends of the tank to transfer the calories and frigories collected by the heat transfer gas to external circuits. The magnetocaloric elements appear as porous discs, stacked in the tank, separated from one another to delineate several chambers, or joined to one another to delineate only two chambers, according to the chosen embodiment. Each movement of the tank corresponds to a cold cycle or a hot cycle and causes the heat transfer gas to circulate in only one direction. The production cycles of calories and frigories are thus alternate and not simultaneous. Moreover, the heat transfer capacity of a gas is markedly less efficient than that of a liquid. The heat exchange surface between the heat transfer gas and the magnetocaloric elements is also very limited. Given the very low operating temperatures, approximately −200° C., the use of such a heat generator is restricted to laboratory applications. In conclusion, the calorific value of such a heat generator is too low for an industrial or domestic application.

Publication WO 2005/093343 describes the principle of a magnetocaloric heat generator, which uses the air to be heated or cooled of a motor vehicle as heat transfer fluid. This solution is designed so that, in a starting phase, the refrigeration system operates in a closed loop, with the air being circulated according to a reciprocating movement through the magnetocaloric element between a hot tank and a cold tank, using a pistons and walking beam system, until the desired temperature gradient is achieved. As in the previous example, each movement of the piston corresponds to a cold or hot cycle and causes the air to circulate in only one direction. The production cycles of calories and frigories are thus alternate and not simultaneous. Moreover, the heat exchange surface between the air and the magnetocaloric element is very limited and does not allow a sufficient calorific value to be achieved for an industrial or domestic application, given also that the heat transfer fluid is a gas and not a liquid.

Publication WO 2007/026062, which belongs to the applicant, describes a magnetocaloric generator that comprises two distinct collecting circuits, namely a hot collecting circuit and a cold collecting circuit, hydraulically tight with one another, and both coupled to a heat exchanger that serves as a means of evacuating the calories or frigories. The heat transfer fluid circulates in a closed loop within the collecting circuits, which comprise a part outside the generator and require at least one pump, means of commutation synchronized with the variation in magnetic field, ducts and connections.

DESCRIPTION OF THE INVENTION

The present invention aims to solve this problem by introducing an industrial solution based on a heat generator with magnetocaloric material that is economically viable, and modular so it can easily be configured according to given specifications as part of industrial as well as domestic applications. It also aims to simplify and rationalize the way the heat transfer fluid circulates by discarding the use of one or more hydraulic systems.

To this end, the invention relates to a heat generator of the kind mentioned in the preamble, characterized in that said means of circulation are synchronized with the variation in magnetic field and arranged to alternately circulate said heat transfer fluid inside said thermal module in two opposite directions at the same time, between the hot and cold exchange chambers through said magnetocaloric elements, in a reciprocating movement, so that a first fraction of the heat transfer fluid circulates towards the hot exchange chamber through said magnetocaloric elements subjected to a heating cycle, and that a second fraction of the heat transfer fluid circulates towards the cold exchange chamber through said magnetocaloric elements subjected to a cooling cycle, and inversely, and in that the means of circulation comprise at least one set of N pistons positioned opposite said magnetocaloric elements and subjected to a reciprocating translation movement by a driving mechanism that comprises at least one actuating cam driven by an actuator.

One thus obtains a number N of mini heat generators operating simultaneously and in parallel, allowing the heat exchange surface with heat transfer fluid, and thus the calorific value of such a generator, to be multiplied by the coefficient N. Moreover, each magnetic cycle is optimally used since the circulation of the heat transfer fluid in both directions allows the simultaneous collection of the calories produced by the magnetocaloric elements subjected to an increase in magnetic field (heating cycle) and of the frigories produced by the magnetocaloric elements subjected to a reduction in magnetic field (cooling cycle).

The hot and cold exchange chambers form recovery chambers for the thermal energy produced by the generator and allow achieving a mixture of the heat transfer fluid resulting from a heating cycle for the hot chamber on the one hand, and from a cooling cycle for the cold chamber on the other.

Preferably, the magnetocaloric elements comprise emerging fluid passages, which are formed of pores, channels, grooves or a combination of these elements.

In a preferred embodiment, the means of circulation comprise two sets of N pistons positioned on each side of said magnetocaloric elements to circulate the heat transfer fluid in both directions.

The actuating cam may comprise a cam profile with a roughly sinusoidal shape, the amplitude of which determines the stroke of said pistons and the sinusoidal phase of which globally corresponds to a heating cycle and a cooling cycle of said magnetocaloric elements.

In the vicinity of said magnetocaloric elements, the magnetic devices may comprise at least one magnetic arrangement formed of alternate magnetized zones and non magnetized zones, said magnetic arrangement being coupled with an actuator so as to be mobile in relation to said magnetocaloric elements.

These magnetic devices preferably comprise a field closing device positioned opposite said magnetic arrangement to close the magnetic flux generated by said magnetized zones through said magnetocaloric elements.

Each couple formed by a magnetized zone and a non magnetized zone of said magnetic arrangement advantageously extends over a distance that globally corresponds to a sinusoid of said cam profile.

In the preferred embodiment, each magnetized zone comprises at least two permanent magnets with opposite polarities, assembled on a core with high magnetic permeability so as to concentrate the magnetic flux of said magnets towards the magnetocaloric elements.

The thermal module may advantageously have a circular structure in which the magnetocaloric elements are arranged in a circle around a central axis and the actuating cam as well as the magnetic arrangement are concentric with this central axis and put into rotation around said axis.

In an alternative embodiment, the thermal module may also have a linear structure in which the magnetocaloric elements are aligned and the actuating cam together with the magnetic arrangement are driven into reciprocating translation along said elements.

The heat generator may advantageously comprise X number of thermal modules stacked to form a generator with X thermal stages and said thermal modules may be assembled in pairs using intermediate chambers. In this case, the pistons of two consecutive thermal modules are advantageously shared.

Hence, by stacking several thermal modules, the heating and cooling of the heat transfer fluid are achieved in a staged manner, thus making it possible to increase the temperature gradient between the cold and hot ends of the said generator as desired.

The intermediate chambers may communicate with said pistons and form heat transfer fluid mixing chambers between two consecutive thermal modules.

The intermediate chambers may also not communicate with said pistons, as the heat transfer fluid passes from one thermal module to another via said magnetocaloric elements.

The hot exchange chamber and the cold exchange chamber may each be connected to an external circuit fitted with a device that allows a heat exchange only after reaching a predefined temperature inside said exchange chamber in question.

BRIEF DESCRIPTION OF THE DRAWINGS

The present invention and its advantages will be better revealed in the following description of two embodiments given as a non limiting example, in reference to the drawings in appendix, in which.

ILLUSTRATIONS OF THE INVENTION

Figure 1:
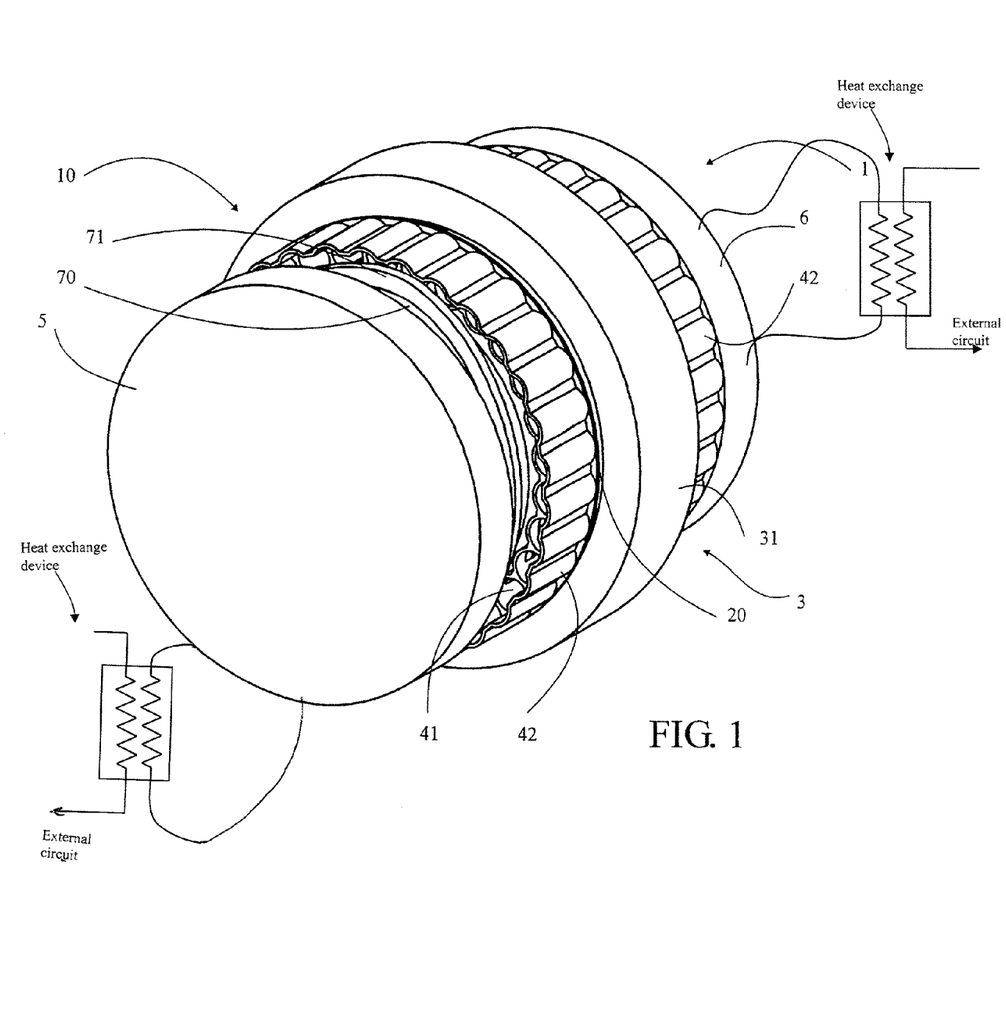
FIG. 1 is a perspective, partially exploded view of a first embodiment of a heat generator according to the invention.
Figure 2:
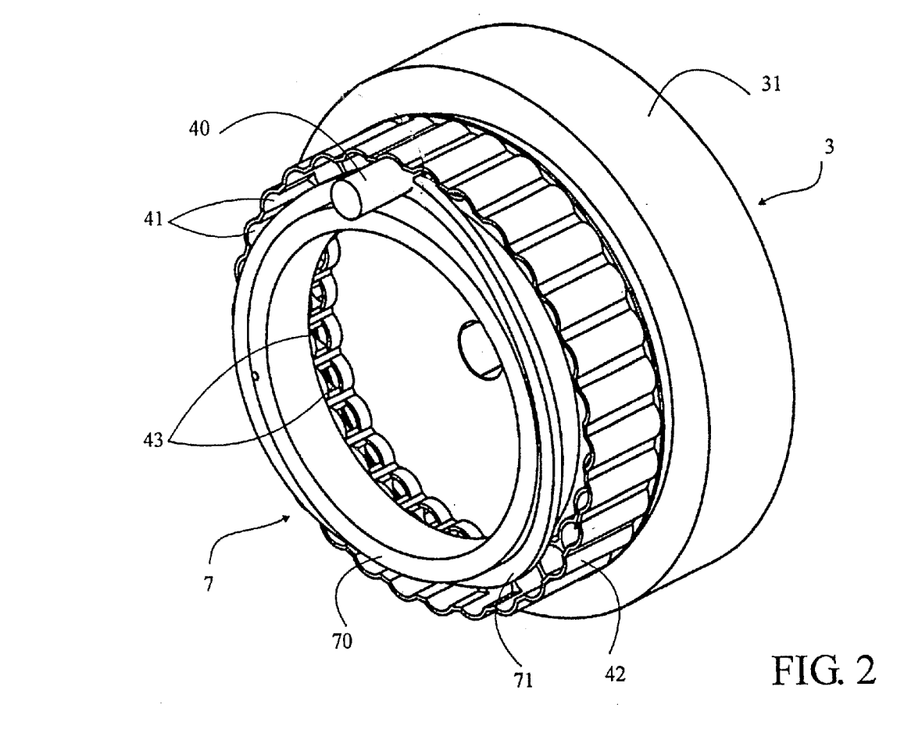
FIG. 2 is a perspective view of a part of the generator from FIG. 1.
Figure 3:
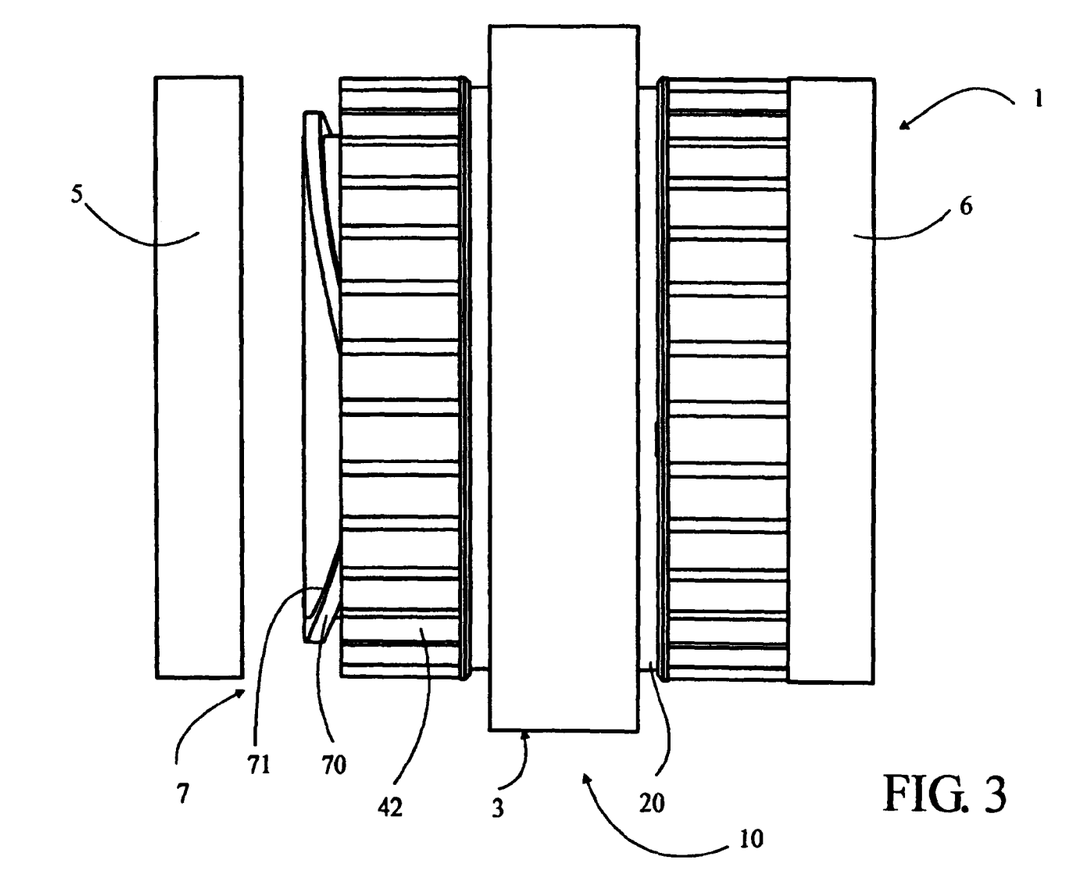
FIG. 3 is a plane view of the generator from FIG. 1.
Figure 4:
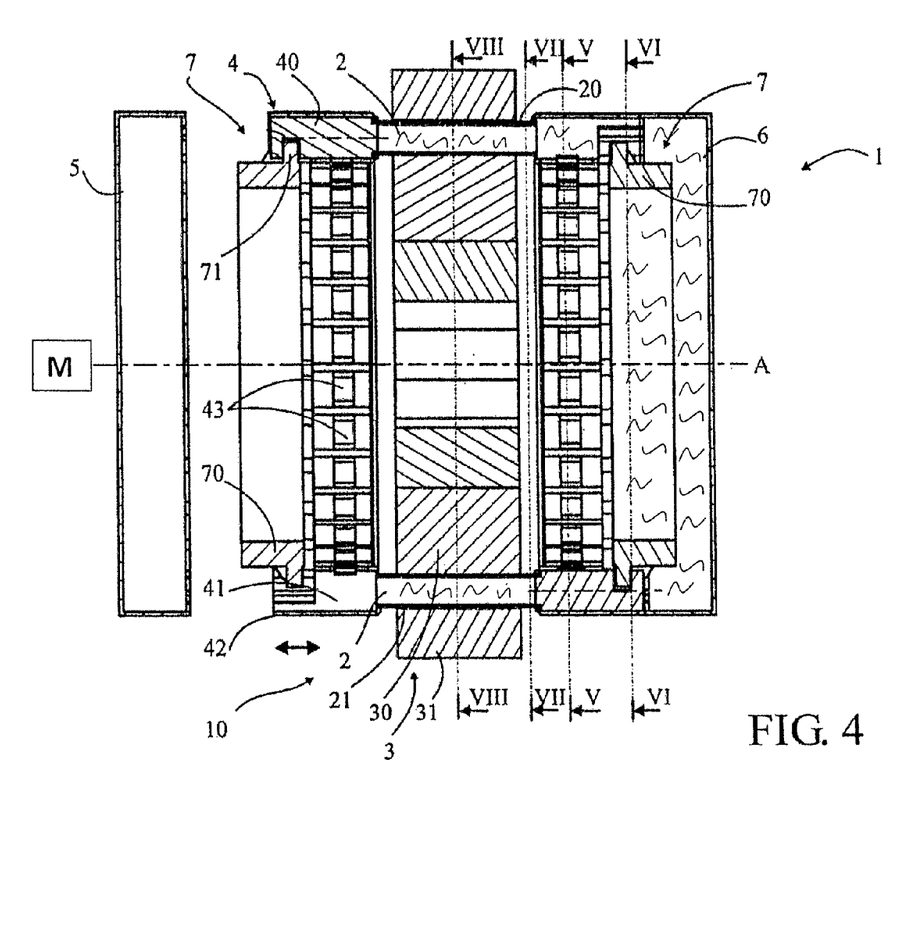
FIG. 4 is an axial section view of the generator from FIG. 3, FIGS. 5 to 8 are radial sections of the generator from FIG. 3, respectively according to section planes V-V, VI-VI, VII-VII and VIII-VIII.
Figure 5:
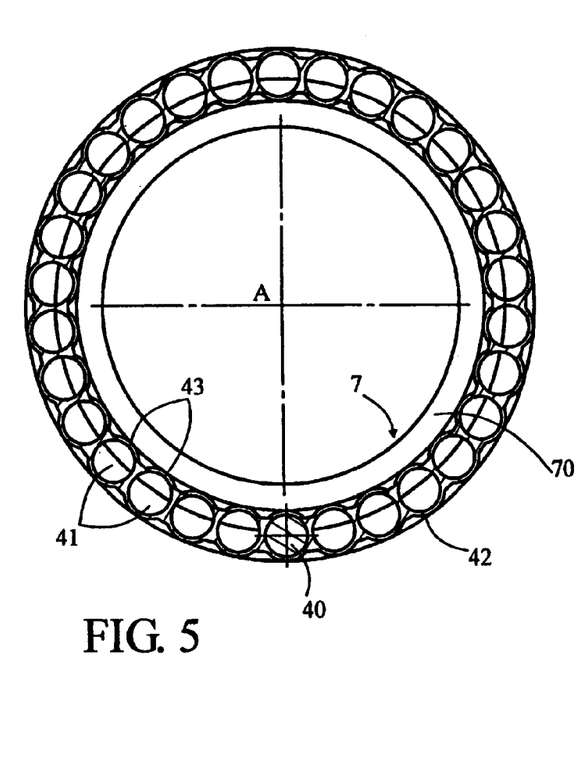
Figure 6:
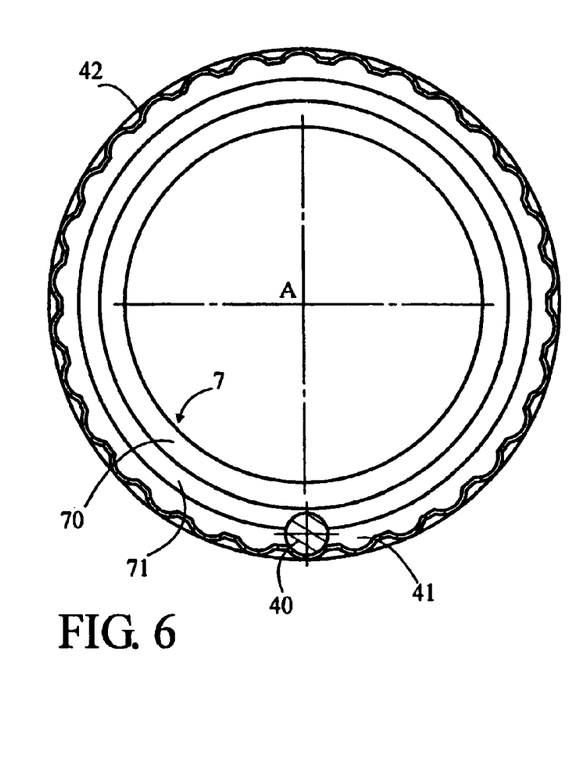
Figure 7:
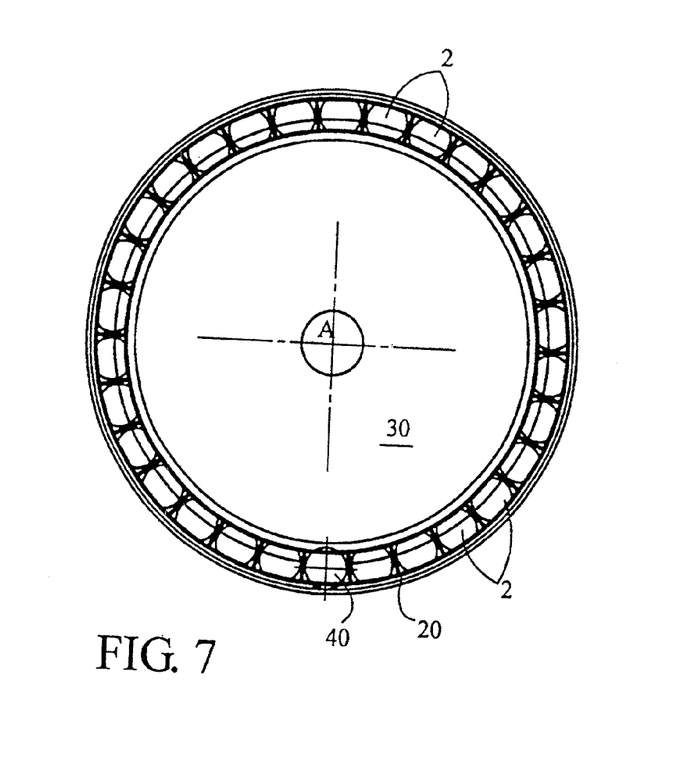

In reference to FIGS. 1 to 8 and more particularly to FIG. 4, the heat generator 1 according to the invention comprises a thermal module 10 that includes N number of magnetocaloric elements 2 arranged adjacently in a circle around a central axis A, forming an annular cylindrical structure. This embodiment is only an example, given that the heat generator 1 may also have a linear structure.

This heat generator 1 comprises magnetic devices 3 capable of alternately subjecting the magnetocaloric elements 2 to a variation in magnetic field so as to vary their temperature according to the Carnot cycle, and to alternately create a heating cycle and a cooling cycle in each magnetocaloric element 2. This generator contains a heat transfer fluid that is made to move inside said thermal module 10 via means of circulation 4 in order to collect the calories and frigories produced by the magnetocaloric elements 2 during the successive heating and cooling cycles, and to respectively store them in a hot exchange chamber 5 and a cold exchange chamber 6 positioned at the hot and cold ends of this generator. Each exchange chamber 5, 6 is designed to exchange with an external circuit via a heat exchanger (not represented) in order to use the calories and frigories produced by said generator. The means of circulation 4 are synchronized with the variation in magnetic field to simultaneously circulate the heat transfer fluid in two opposite directions, so that a first fraction of heat transfer fluid circulates towards the hot exchange chamber 5 through the magnetocaloric elements 2 subjected to a heating cycle, and that a second fraction of heat transfer fluid circulates towards the cold exchange chamber 6 through the magnetocaloric elements 2 subjected to a cooling cycle, and inversely.

Figure 12:
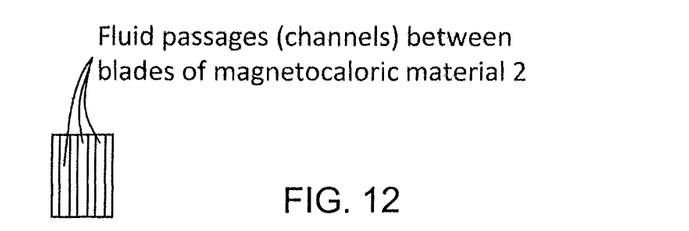
Figure 13:
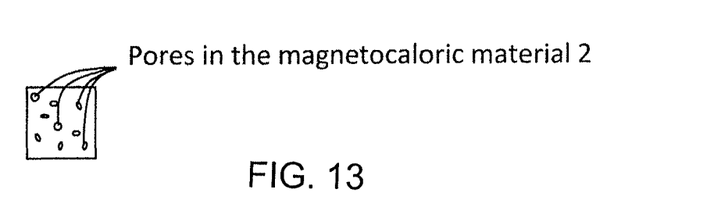
Figure 14:
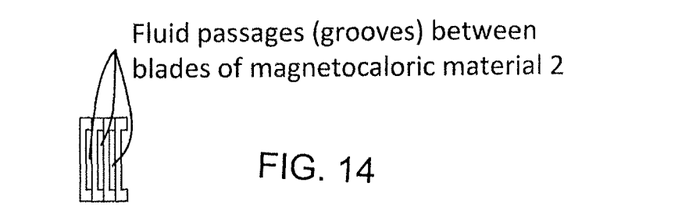

In the example represented, the magnetocaloric elements 2 consist of partially cylindrical sections that are cut, machined and/or moulded out of a magnetocaloric material, placed in a fixed support 20 fitted with complementary shaped housings 21. The shape of the magnetocaloric elements 2 is not restrictive and may be changed to any other three-dimensional shape. Magnetocaloric material means a material that is partly or entirely made out of a magnetocaloric substance, such as gadolinium (Gd), a gadolinium alloy containing for example silicon (Si), germanium (Ge), a manganese alloy containing for example iron (Fe), magnesium (Mg), phosphorus (P), a lanthanum alloy, a nickel (Ni) alloy, any other equivalent material or magnetizable alloy, or out of a combination of various magnetocaloric materials, in the form of powder, particles, solid block, sintered or porous. The choice between these magnetocaloric materials is made according to the heating and cooling capacities desired and the ranges of temperature required. These magnetocaloric elements 2 are permeable to the heat transfer fluid and therefore comprise emerging fluid passages, as shown in FIGS. 12-14, which may be formed by the pores of a porous material, mini- or micro-channels machined out of a solid block or obtained by assembling superimposed grooved plates, and other similar elements.

The means of circulation 4 of the heat transfer fluid comprise at least one and preferably two sets of N pistons 40, subjected to a reciprocating movement, parallel to the central axis A, by a driving mechanism 7, with each piston 40 arranged in opposition and along the axis of a magnetocaloric element 2, so as to circulate the heat transfer fluid contained in said module through said element in a direction that depends on whether the said element is subjected to a heating cycle or a cooling cycle. Each magnetocaloric element 2 is thus associated to two pistons 40, aligned along its axis and opposite each end, driven in opposite directions. For the heat transfer fluid to circulate from an exchange chamber 5, 6 to the other exchange chamber 6, 5, the jacket 42 comprises openings 43 that connect the inside volume of the thermal module 10 and the housing 41 of the pistons 40. In reference to the circular structure of the heat generator 1 as illustrated, the pistons 40 are arranged adjacently, in a circle around central axis A, and form an annular structure. In the case of a linear heat generator, the pistons would be aligned. These pistons 40 consist of cylindrical parts, guided in complementary shaped housings 41 arranged in a jacket 42. Any other piston shape may also be appropriate and may be determined to minimize hydraulic pressure losses. The jacket 42 is a fixed part, installed on the support 20 of the magnetocaloric elements 2 using any adequate means of assembly. The support 20 and the jacket 42 may also made from a single part. These parts are preferably made out of thermally insulating materials, such as synthetic materials or similar.

In the example represented, the driving mechanism 7 comprises at least one and preferably two actuating cams 70 coupled to the pistons 40, driven by an actuator (not represented). Each actuating cam 70 may comprise a cam profile 71 with a roughly sinusoidal or similar shape (see FIGS. 2 and 3), the amplitude of which determines the stroke of the pistons 40 and the sinusoidal phase of which globally corresponds to a heating cycle and a cooling cycle of the magnetocaloric elements 2. The cam profile 71 forms a salient rib, placed inside a groove of each piston 40, thus ensuring a mechanical coupling between these parts. In reference to the circular structure of the heat generator 1 as illustrated, the actuating cams 70 are annular and put into continuous or non continuous rotation around the central axis A, by an electric motor or any equivalent actuator. In the case of a linear heat generator, the actuating cams are rectilinear and subjected to a reciprocating translation movement.

Figure 8:
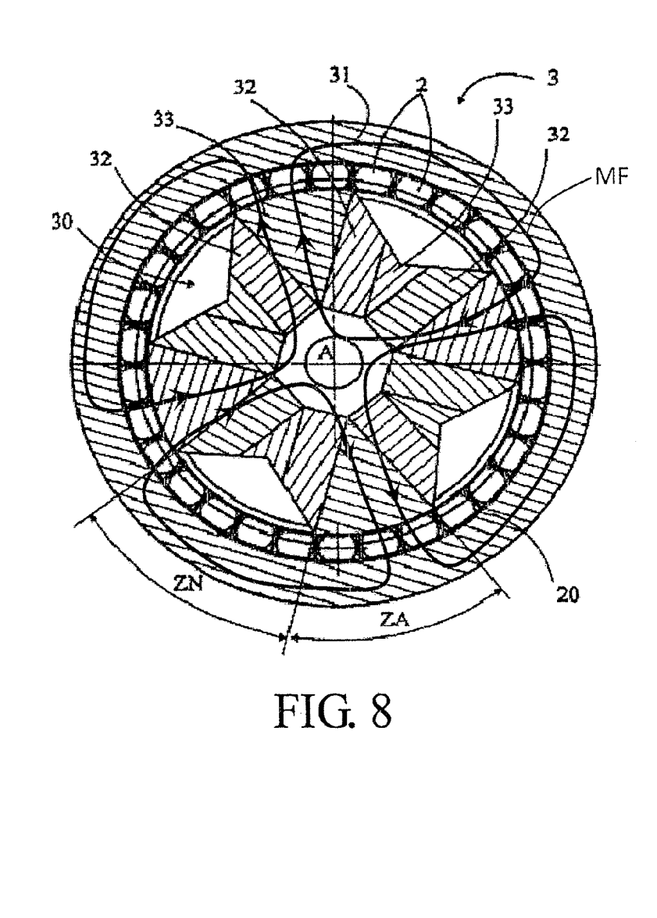

In reference more particularly to FIG. 8, the magnetic devices 3 comprise a magnetic arrangement 30 formed of alternate magnetized zones ZA and non magnetized zones ZN in the vicinity of the magnetocaloric elements 2. Each couple of magnetized ZA and non magnetized ZN zones extends over a distance that globally corresponds to a sinusoid of the cam profile 71, with the magnetized zone ZA generating the heating cycle and the non magnetized zone ZN the cooling cycle. In the example represented, the magnetized zone ZA comprises at least two permanent magnets 32 with opposite polarities, assembled on a core 33 with high magnetic permeability so as to concentrate the magnetic flux towards the magnetocaloric elements 2. Evidently, any other construction or arrangement is possible. In the example represented and in reference to the circular structure of the generator, the magnetic arrangement 30 is cylindrical, installed inside the generator 1 and put into continuous or non continuous rotation around the central axis A by an electric motor or any equivalent actuator. In this example, the magnetic arrangement 30 comprises four pairs of magnetized ZA and non magnetized ZN zones, each covering a 90° angular sector. Correspondingly, the cam profile 71 of the actuating cams 70 comprises four sinusoids that each extend over the same angular sector. The cam profile 71 that is illustrated on the figures only shows two sinusoids to simplify the graphical representation. The magnetic devices 3 also comprise a field closing device 31 positioned opposite the magnetic arrangement 30, and in this example outside the generator 1, to close the magnetic flux generated by the magnetized zones ZA through the magnetocaloric elements 2. In the case of a linear heat generator, the magnetic devices 3 are rectilinear and subjected to a reciprocating translation movement.

In this example, the moving parts of the heat generator 1 are concentric with the central axis A and may be driven by the same inside and central actuator or by any equivalent means. In the case of a heat generator with a smaller diameter, it is possible to reverse this configuration, by driving the moving parts from the outside, with the actuating cams 70 and the magnetic arrangement 30 positioned outside the magnetocaloric elements 2. It is also possible to angularly shift the movement of the pistons 40 in relation to the movement of the magnetic arrangement 30 in order to account for the thermal and hydraulic inertias.

The operation of the heat generator 1 consists in controlling the simultaneous and synchronous movement of the magnetic arrangement 30 and of the actuating cams 70 to generate the alternate movement of the heat transfer fluid inside the thermal module 10 between the hot 5 and cold 6 exchange chambers through the magnetocaloric elements 2, in two opposite directions at the same time depending on whether said elements are subjected to the magnetic field or not. The alternate movement of the heat transfer fluid inside a same thermal module 10 makes it possible to increase the temperature gradient between the hot 5 and cold 6 exchange chambers placed at the ends of the said generator. These exchange chambers 5, 6 are designed so that the calories and frigories produced by the generator can be transferred to external circuits (heating, air-conditioning, tempering, etc.), either by conduction or via a heat exchanger (not represented). In an alternative embodiment not represented, the hot exchange chamber and the cold exchange chamber are each connected to an external circuit that may be fitted with a device that allows a heat exchange only after reaching a predefined temperature inside said exchange chamber in question. This device can be a heat sensitive or controlled stop valve. Such a device allows the generator to perform more quickly, since the heat exchange is only possible once the generator has reached a predefined steady state.

The heat transfer fluid used is preferably a liquid. The heat transfer fluid will have a chemical composition that is adapted to the desired range of temperature so as to achieve an optimum heat exchange. This fluid may thus be a liquid, a gas or diphasic. If it is a liquid, one will for example use pure water for positive temperatures and water with antifreeze, for example a glycol-based product or a brine, for negative temperatures.

BEST EMBODIMENT OF THE INVENTION

Figures 9, 10:
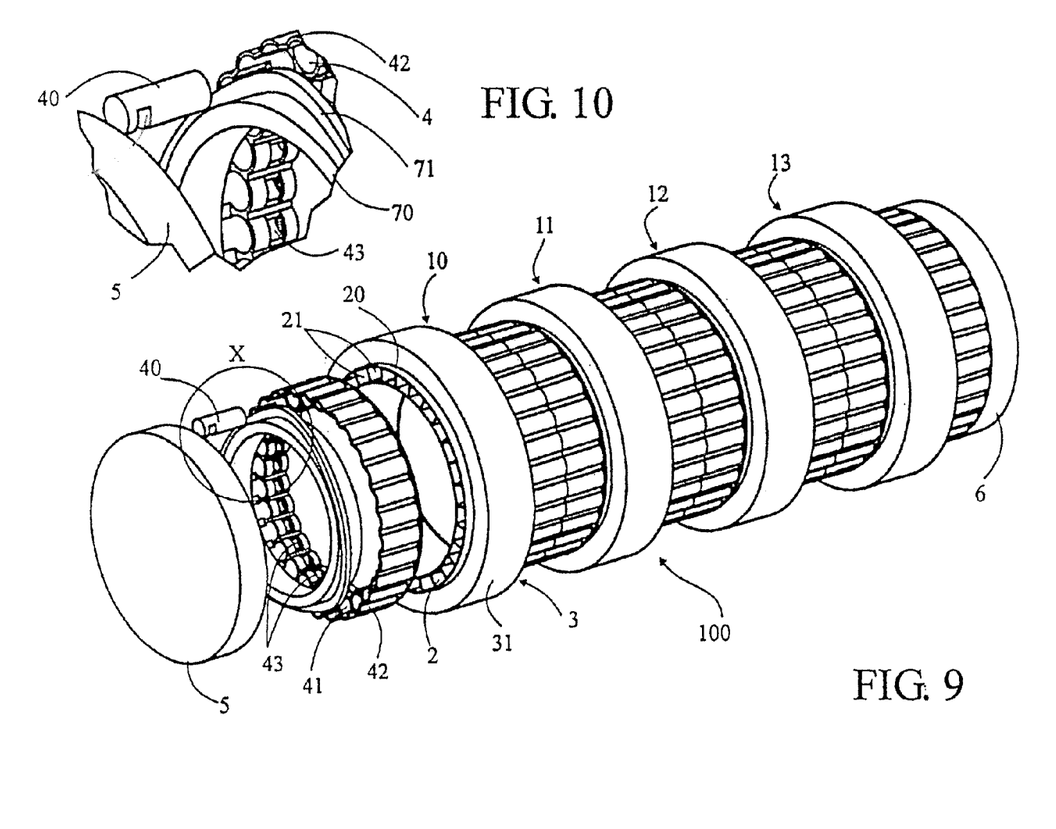
FIG. 9 is a perspective, partially exploded view of a second embodiment of a heat generator according to the invention.
FIG. 10 is an enlarged in view of detail X from FIG. 9.
Figure 11:
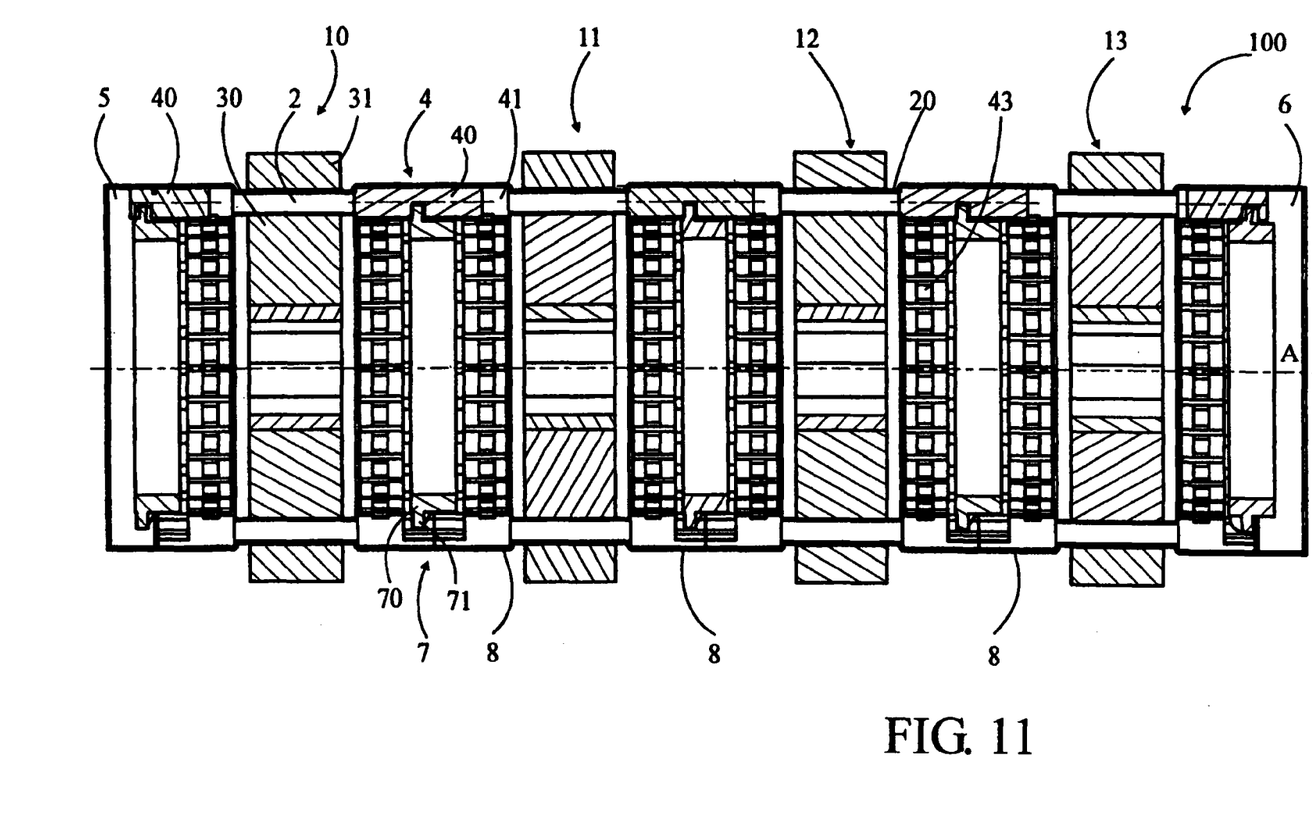
FIG. 11 is an axial section view of the generator from FIG. 9, and FIGS. 12-14 are diagrammatic cross sections of magnetocaloric elements showing emerging fluid passages.

FIGS. 9 to 11 illustrate a heat generator 100 that comprises several thermal modules 10, 11, 12, 13, similar to that previously described, which are stacked to form several thermal stages, and may be identical or not. The thermal modules 10, 11, 12, 13 are assembled in pairs using intermediate chambers 8. In this staged configuration, the pistons of two adjacent thermal modules 10 to 13 may be shared, as illustrated in the figures mentioned above, which allows the cost of such a generator, as well as its overall size, to be simplified and reduced. Consequently, the actuating cams 70 are also shared and positioned inside the intermediate chambers 8. These intermediate chambers 8 may be connected, as illustrated in the figures, or tight. When they are connected, these intermediate chambers 8 allow the heat transfer fluid to be mixed between two successive thermal stages, as the fluid goes from one thermal module to another via the openings 43 made in the jacket 42 of the pistons 40. This thermal mixing helps increase the temperature gradient from one stage to another and, consequently, the temperature gradient between the hot 5 and cold 6 exchange chambers placed at the ends of said generator.

In another alternative embodiment not represented, these intermediate chambers 8 may be tight. In this case, the heat transfer fluid goes from one thermal stage to another only via the magnetocaloric elements 2.

The staged configuration as represented may of course be extended to thermal modules 10 to 13 with a linear structure. The number of thermal modules 10 to 13 is non limiting and is determined according to the application in question.

POSSIBILITIES FOR INDUSTRIAL APPLICATION

All the parts that form the heat generator 1, 100 according to the invention can be mass produced using reproducible industrial processes. All these parts, except the magnetocaloric elements 2 and the magnetic devices 3, can be made from thermally insulating materials, moulded, injected or similar. The thermal modules 10 to 13 and the exchange chambers 5, 6 can be assembled using any suitable sealing means and any appropriate fastening means that is known. The manufacture of the heat generator 1, 100 using compact and stackable thermal modules 10 to 13, which can be standardized, makes it possible to satisfy a wide range of applications, both industrial and domestic, cost-effectively, with limited space requirements, and with a level of performance that is currently unrivalled in terms of calorific value for this type of generator.

The present invention is not limited to the examples of embodiment described but extends to any obvious modification and variation for a person skilled in the art without departing from the scope of protection, as defined by the annexed claims.

The invention claimed is:

1. A heat generator (1, 100) comprising magnetocaloric elements (2) and magnetic devices (3) arranged to alternately subject the magnetocaloric elements (2) to a variation in a magnetic field and alternately create, in each magnetocaloric element (2), a heating cycle and a cooling cycle, at least one heat transfer fluid arranged to collect at least one of heat energy (calories) and cold energy (frigories) produced by the magnetocaloric elements (2) during the heating and cooling cycles,
at least one hot exchange chamber (5) and one cold exchange chamber (6) respectively placed at hot and cold ends of the heat generator (1, 100),
means for circulating (4) the heat transfer fluid between the magnetocaloric elements (2) and the hot and cold exchange chambers (5, 6),
the heat generator comprising at least one thermal module (10-13) comprising at least one set of a number of adjacently arranged magnetocaloric elements (2), and
the means for circulating (4) being synchronized with the variation in magnetic field and being arranged to alternately circulate the heat transfer fluid inside the thermal module (10-13) in two opposite directions at the same time, between the hot (5) and cold (6) exchange chambers through the magnetocaloric elements (2), so that a first fraction of the heat transfer fluid circulates towards the hot exchange chamber (5), through the magnetocaloric elements (2) subjected to a heating cycle, and a second fraction of the heat transfer fluid circulates towards the cold exchange chamber (6) through the magnetocaloric elements (2) subjected to a cooling cycle, and inversely,
wherein the means for circulating (4) are arranged to displace the heat transfer fluid between the hot (5) and cold (6) exchange chambers in a reciprocating movement, and comprise
at least a same number of pistons (40) as the number of adjacently arranged magnetocaloric elements (2),
the pistons (40) are positioned opposite the magnetocaloric elements (2), and
the pistons (40) are subjected to a reciprocating translation movement by a driving mechanism (7) that comprises at least one actuating cam (70) driven by an actuator.

2. The heat generator according to claim 1, wherein an actuating cam (70) comprises a cam profile (71) which has a sinusoidal shape, an amplitude of which determines a stroke of the pistons (40) and a sinusoidal phase of which corresponds to a heating cycle and a cooling cycle of the magnetocaloric elements (2).

3. The heat generator according to claim 2, wherein each couple formed by a magnetized zone (ZA) and a non magnetized zone (ZN) extends over a distance that corresponds to a sinusoid of the cam profile (71).

4. The heat generator according to claim 1, wherein the means for circulating (4) comprise at least twice the number of pistons (40), positioned on each side of the magnetocaloric elements (2), as the number of adjacently arranged magnetocaloric elements (2).

5. The heat generator according to claim 1, wherein the magnetocaloric elements (2) comprise emerging fluid passages, which are formed from one of pores, channels, and grooves.

6. The heat generator according to claim 1, wherein the magnetic devices (3) comprise at least one magnetic arrangement (30), formed of alternate magnetized zones (ZA), and non magnetized zones (ZN), in a vicinity of the magnetocaloric elements (2), the magnetic arrangement (30) is coupled with the actuator so as to be mobile in relation to the magnetocaloric elements (2).

7. The heat generator according to claim 6, wherein the magnetic devices (3) comprise a field closing device (31), positioned opposite the magnetic arrangement (30), for closing the magnetic flux generated by the magnetized zones (ZA) through the magnetocaloric elements (2).

8. The heat generator according to claim 6, wherein each magnetized zone (ZA) comprises at least two permanent magnets (32), which have opposite polarities, assembled on a core (33) with high magnetic permeability so as to concentrate the magnetic flux of the magnets towards the magnetocaloric elements (2).

9. The heat generator according to claim 6, wherein the thermal module (10-13) has a circular structure in which the magnetocaloric elements (2) are arranged in a circle around a central axis (A), and the actuating cam (70) and the magnetic arrangement (30) are concentric with this central axis (A) and for rotation around the axis (A).

10. The heat generator according to claim 1, wherein
the heat generator comprises X number of thermal modules (10-13) stacked to form the heat generator with a same X number of thermal stages, and
the thermal modules (10-13) are assembled in pairs using intermediate chambers (8).

11. The heat generator according to claim 10, wherein the intermediate chambers (8) communicate with the pistons (40) and form heat transfer fluid mixing chambers between two consecutive thermal modules (10-13).

12. The heat generator according to claim 10, wherein the intermediate chambers (8) do not communicate with the pistons (40), as the heat transfer fluid passes from one thermal module (10-13) to another via the magnetocaloric elements (2).

13. The heat generator according to claim 10, wherein the pistons (40) of two consecutive thermal modules (10-13) are shared.

14. The heat generator according to claim 1, wherein the hot exchange chamber and the cold exchange chamber are each connected to an external circuit fitted with a device that allows heat exchange only after reaching a predefined temperature inside the exchange chamber in question.

15. The heat generator according to claim 1, wherein the heat transfer fluid is monophasic fluid.

* * * * *